United States Patent [19]

Kumasaka et al.

[11] Patent Number: 5,018,781
[45] Date of Patent: May 28, 1991

[54] ROOF STRUCTURE FOR MODULAR VEHICLE BODY AND METHOD OF BUILDING SAME

[75] Inventors: Hideyuki Kumasaka, Yokohama; Kouji Takao, Atsugi; Hiroshi Kuriyama, Yokohama; Tarou Hagiwara; Kenichi Miyazaki, both of Sagamihara, all of Japan

[73] Assignee: Nissan Motor Co., Ltd., Yokohama, Japan

[21] Appl. No.: 438,950

[22] Filed: Nov. 17, 1989

Related U.S. Application Data

[63] Continuation of Ser. No. 173,938, Mar. 28, 1988, abandoned.

[30] Foreign Application Priority Data

Mar. 26, 1987 [JP] Japan .................................. 62-71997
Mar. 31, 1987 [JP] Japan .................................. 62-78045

[51] Int. Cl.$^5$ .............................................. B62D 25/06
[52] U.S. Cl. ....................................... 296/210; 296/196; 296/197; 296/203
[58] Field of Search ................ 296/96.21, 193–197, 296/203, 210; 29/469

[56] References Cited

U.S. PATENT DOCUMENTS

| | | | |
|---|---|---|---|
| 2,389,907 | 11/1945 | Helmuth | 296/203 |
| 2,988,397 | 6/1961 | Brueder | 296/196 |
| 3,021,172 | 2/1962 | Fiala et al. | 296/203 |
| 3,022,105 | 2/1962 | Tjaarda | 296/196 |
| 3,326,599 | 6/1967 | Pashenee | 296/210 |
| 3,541,668 | 11/1970 | Wessells et al. | 29/469 |
| 3,827,137 | 8/1974 | Schubach | 29/469 |
| 3,882,592 | 5/1975 | Mooney | 29/469 |
| 4,252,364 | 2/1981 | Toyama et al. | 296/197 X |
| 4,573,734 | 3/1986 | Gass | 296/189 |
| 4,634,173 | 1/1987 | Aonuma | 296/195 X |
| 4,730,870 | 3/1988 | DeRees | 296/197 |
| 4,759,489 | 7/1988 | Pigott | 29/469 X |

FOREIGN PATENT DOCUMENTS

| | | | |
|---|---|---|---|
| 0075754 | 4/1983 | European Pat. Off. | 296/210 |
| 0076934 | 4/1983 | European Pat. Off. | 296/210 |
| 0188837 | 7/1986 | European Pat. Off. | |
| 203484 | 12/1986 | European Pat. Off. | |
| 0240470 | 10/1987 | European Pat. Off. | |
| 2829608 | 3/1979 | Fed. Rep. of Germany | |
| 2916013 | 10/1980 | Fed. Rep. of Germany | |
| 3119666 | 1/1982 | Fed. Rep. of Germany | 296/203 |
| 3119572 | 3/1982 | Fed. Rep. of Germany | 296/197 |
| 3725807 | 2/1988 | Fed. Rep. of Germany | 296/210 |
| 36117 | 3/1980 | Japan | 296/194 |
| 114165 | 7/1984 | Japan | 296/210 |
| 8505604 | 12/1985 | PCT Int'l Appl. | 296/210 |
| 87/03846 | 7/1987 | PCT Int'l Appl. | |
| 626305 | 7/1949 | United Kingdom | 296/203 |
| 737655 | 9/1955 | United Kingdom | 296/203 |
| 1488793 | 10/1977 | United Kingdom | |
| 2096066 | 10/1982 | United Kingdom | |
| 2150088 | 6/1985 | United Kingdom | |
| 2187683 | 9/1987 | United Kingdom | |

Primary Examiner—Dennis H. Pedder
Attorney, Agent, or Firm—Foley & Lardner

[57] ABSTRACT

A roof structure for a modular vehicle body consists of a plurality of independent sections, i.e., a pair of roof side rails constituting part of body side assemblies, a front roof rail, a rear roof rail and a roof. The front roof rail extends between the front end of the roof side rails and is mechanically fastened to same by matched flanges and brackets. The rear roof rail extends between the rear ends of the roof side rails and attached to same similarly to the front roof rail. The roof is provided with brackets which are respectively placed on the front roof rail, rear roof rail and the roof side rails and mechanically fastened to same.

2 Claims, 6 Drawing Sheets

ROOF STRUCTURE FOR MODULAR VEHICLE BODY AND METHOD OF BUILDING SAME

This application is a continuation of application Ser. No. 07/173,938, filed Mar. 28, 1988, now abandoned

BACKGROUND OF THE INVENTION

1. Field of the Invention

The present invention relates in general to a modular vehicle body and more particularly to a roof structure for a modular vehicle body. Further, the present invention relates to a method of building a roof structure for a modular vehicle body.

2. Description of the Prior Art

Unitized bodies have been used for many automobiles, particularly for most passenger cars. Such unitized bodies, however, cause problems in the installation of components and inspection of the same since access to the spaces for disposition of the components is obstructed by the body section enclosing the spaces. For example, installation of some devices, components or upholstery requires a worker to get into the vehicle cabin or to get his hands into the vehicle cabin through an opening of the vehicle body, resulting in the necessity for awkward, difficult and time-cosuming work and therefore expensive assembly work.

A roof structure of a modular vehicle body causes a problem with increasing the assembly efficiency and improving the vehicle's appearance.

SUMMARY OF THE INVENTION

In accordance with the present invention, there is provided a novel roof structure for a modular vehicle body which comprises a roof having an end, a roof rail extending along the above mentioned end of the roof and having a horizontal portion, a bracket secured to the above mentioned end of the roof and having a horizontal portion placed on the above mentioned horizontal portion of the roof rail and mechanical fastening means for mechanically fastening the above mentioned horizontal portions of the roof rail and the bracket together.

In another form of the invention, the roof structure comprises a pair of roof side rails each constituting part of body side assemblies and each having at the front and rear ends thereof bracket means, a roof having on the inner side thereof bracket means, a front roof rail having at the laterally opposed ends thereof flange means matched with the bracket means at the front ends of the roof side rails, the front roof rail having between the flange means thereof bracket means matched with the bracket means of the roof, a rear roof rail having at the laterally opposite ends thereof flange means matched with the bracket means at the rear ends of the roof side rails, the rear roof rail having between the flange means thereof bracket means matched with the bracket means of the roof and mechanical fastening means for mechanically fastening the flange means of the front roof rail and the rear roof rail to the bracket means of the roof side rails and for fastening the bracket means of the roof to the bracket means of the front roof rail and the rear roof rail.

In accordance with the present invention, there is further provided a method of building a roof structure for a modular vehicle body which comprises preparing a pair of body side assemblies having roof side rails, a roof having on the inside thereof a plurality of brackets, a front roof rail and a rear roof rail independently, making the front roof rail extend between the front ends of the roof side rails and mechanically fastening the former to the latter, making the rear roof rail extend between the rear ends of the roof side rails and mechanically fastening the former to the latter and mechanically fastening the brackets of the roof to the front roof rail, the rear roof rail and the body side rails.

In a further form of the invention, the method comprises preparing a pair of body side assemblies having body side rails, a roof, a front roof rail and a rear roof rail independently, providing bracket means to the front ends of the roof side rails, providing bracket means to the rear ends of the roof side rails, providing flange means to the longitudinal ends of the front roof rail, providing flange means to the longitudinal ends of the rear roof rail, providing bracket means to the front roof rail in the place intermediate between the longitudinal ends thereof, providing bracket means to the rear roof rail in the place intermediate between the longitudinal ends thereof, providing bracket means to the roof, matching the flange means of the front roof rail with the bracket means at the front ends of the roof side rails and fastening the former to the latter, matching the flange means of the rear roof rail with the bracket means at the rear ends of the roof side rails and fastening the former to the latter and matching the bracket means of the roof with the bracket means of the front roof rail and the bracket means of the rear roof rail and fastening the former to the latter.

The above structure and method are effective for solving the above noted problem.

It is accordingly an object of the present invention to provide a novel roof structure for a modular vehicle body which is easy in building or assemble and can improve the vehicle's appearance.

It is another object of the present invention to provide a novel roof structure of the above described character which is suited for manufacture and assembly using robots.

It is a further object of the present inventionto provide a novel roof structure of the above described character which makes it possible to produce various types of vehicles with ease and efficiency.

It is a further object of the present invention to provide a novel method of building a roof structure of the above described character.

DETAILED DESCRIPTION OF THE PREFERRED EMBODIMENTS

Figures 6, 7:
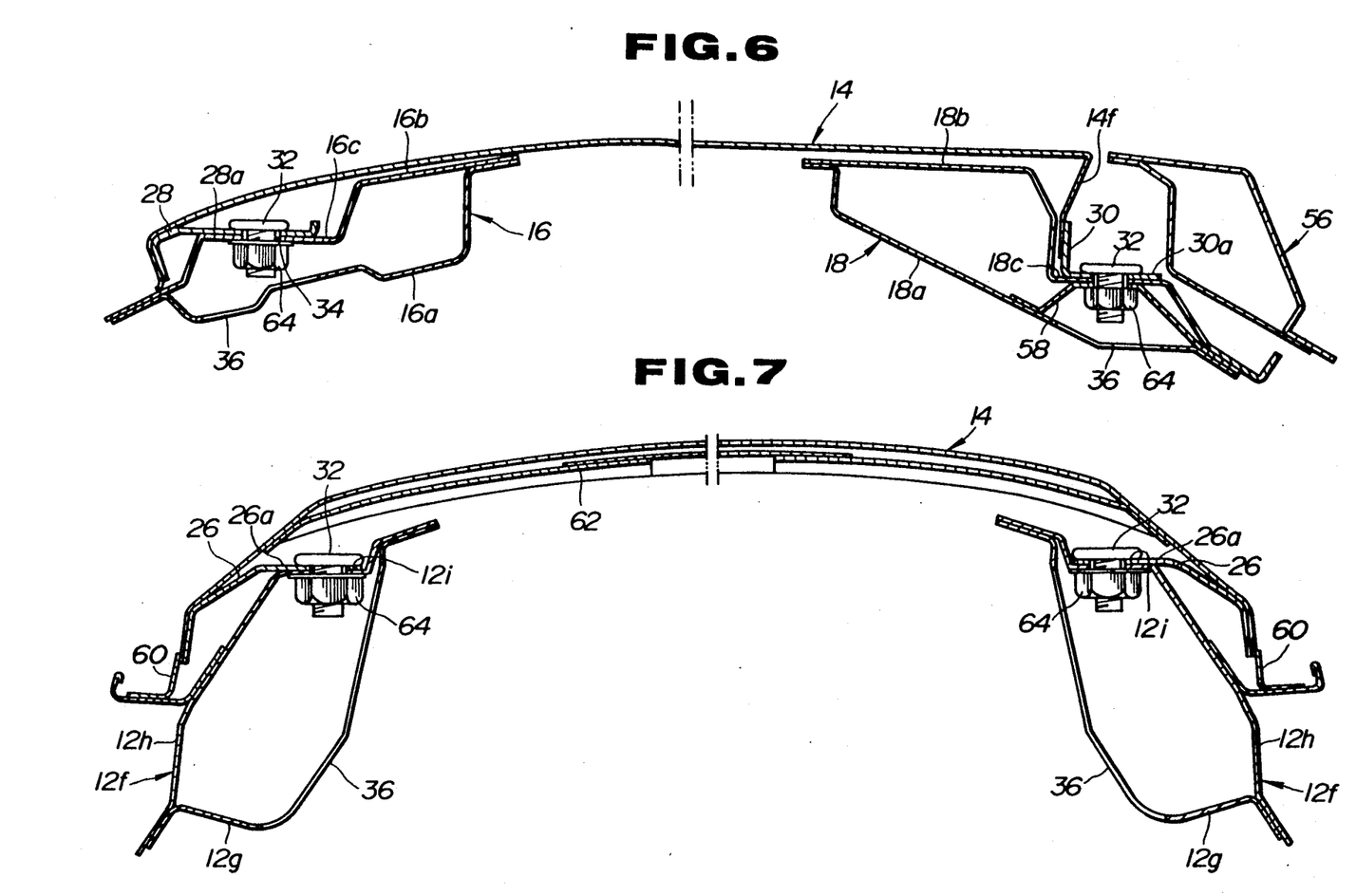
FIG. 6 is a sectional view taken along the line VI—VI of FIG. 5.
FIG. 7 is a sectional view taken along the line VII—VII of FIG. 5.

Referring to FIGS. 1 to 9, a roof structure 10 for a modular vehicle body according to an embodiment of the present invention is shown as comprising a pair of body side assemblies 12 and 12, a roof 14, a front roof rail 16 and a rear roof rail 18. The body side assemblies 12 and 12 are joined with an engine compartment assembly 20, floor assembly 22 and a rear end assembly 24. Since this embodiment is an application to a 2-door sedan hatchback type vehicle, each body side assembly 12 includes a side sill 12a, rear fender 12b, front pillar 12c, center pillar 12d, rear pillar 12e and a roof side rail 12f. The roof side rail 12f extends between the upper ends of the front and rear pillars 12c and 12e and joined with same. The roof side rail 12f has between the front and rear end thereof an intermediate portion with which the upper end of the center pillar 12d is joined. The front pillar 12c, center pillar 12d, rear pillar 12e, roof side rail 12f and side sill 12a are respectively constituted by inner and outer panels in such a way as to have box-like closed sections. In this connection, as shown in FIG. 7, each roof side outer rail 12f is constituted by an inner panel 12g and outer panel 12h to have a box-like closed section.

Figure 9:
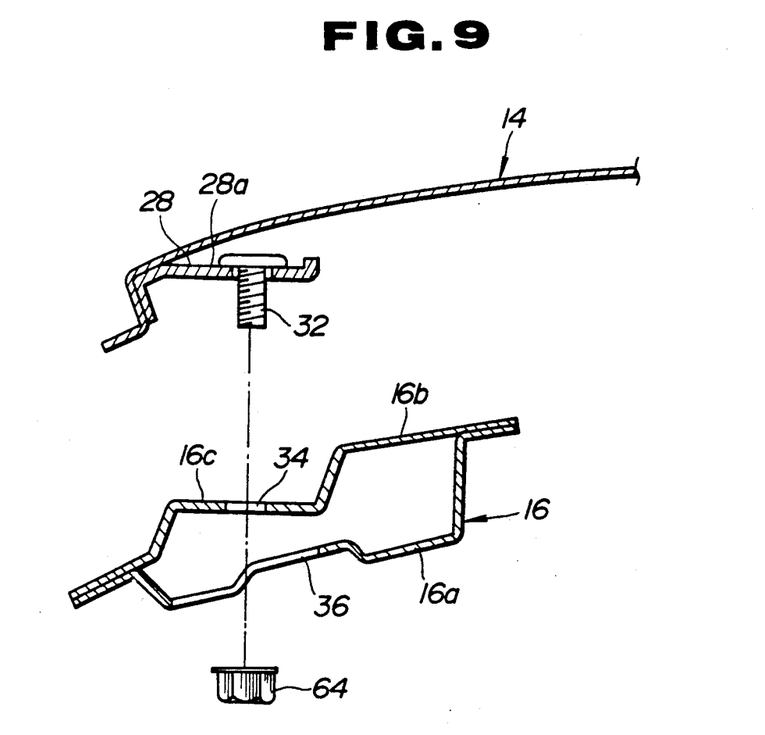
FIG. 9 is an exploded sectional view of a front end portion of the roof structure of FIG. 2.

The roof 14 is substantially square in plan view and has at the four corners thereof extensions 14a–14d the outer surfaces of which extend smoothly and continuously from the outer surfaces of the front pillars 12c and rear pillars 12e when the roof 14 is installed in place. Brackets 26, 28 and 30 are attached to the lateral ends, front end and the rear end of the roof 14, respectively. The brackets 26, 28 and 30 each have horizontal portions 26a, 28a and 30a and a plurality of bolts 32 secured to the horizontal portions 26a, 28a and 30a to project downwardly therefrom. More specifically, as shown in FIG. 7, the brackets 26 and 26 are attached to the lateral end inner surfaces of the roof 14 and project laterally inwardly to have the horizontal portions 26a and 26a form a dual-wall structure together with the roof 14. As shown in FIGS. 6 and 9, the bracket 28 is attached to the front end inner surface of the roof 14 and projects rearwardly therefrom to have the horizontal portion 28a form a dual-wall structure together with the roof 14. As shown in FIG. 6, the rear bracket 30 is attached to a rear end depending flange 14f and projects rearwardly therefrom to have the horizontal portion 30a. The front roof rail 16 and the rear roof rail 18 are respectively constituted by inner and outer panels 16a and 16b, 18a and 18b in such a way as to have box-like closed sections elongated laterally of the vehicle body to serve as rigid frame members of the vehicle body.

Figure 3:
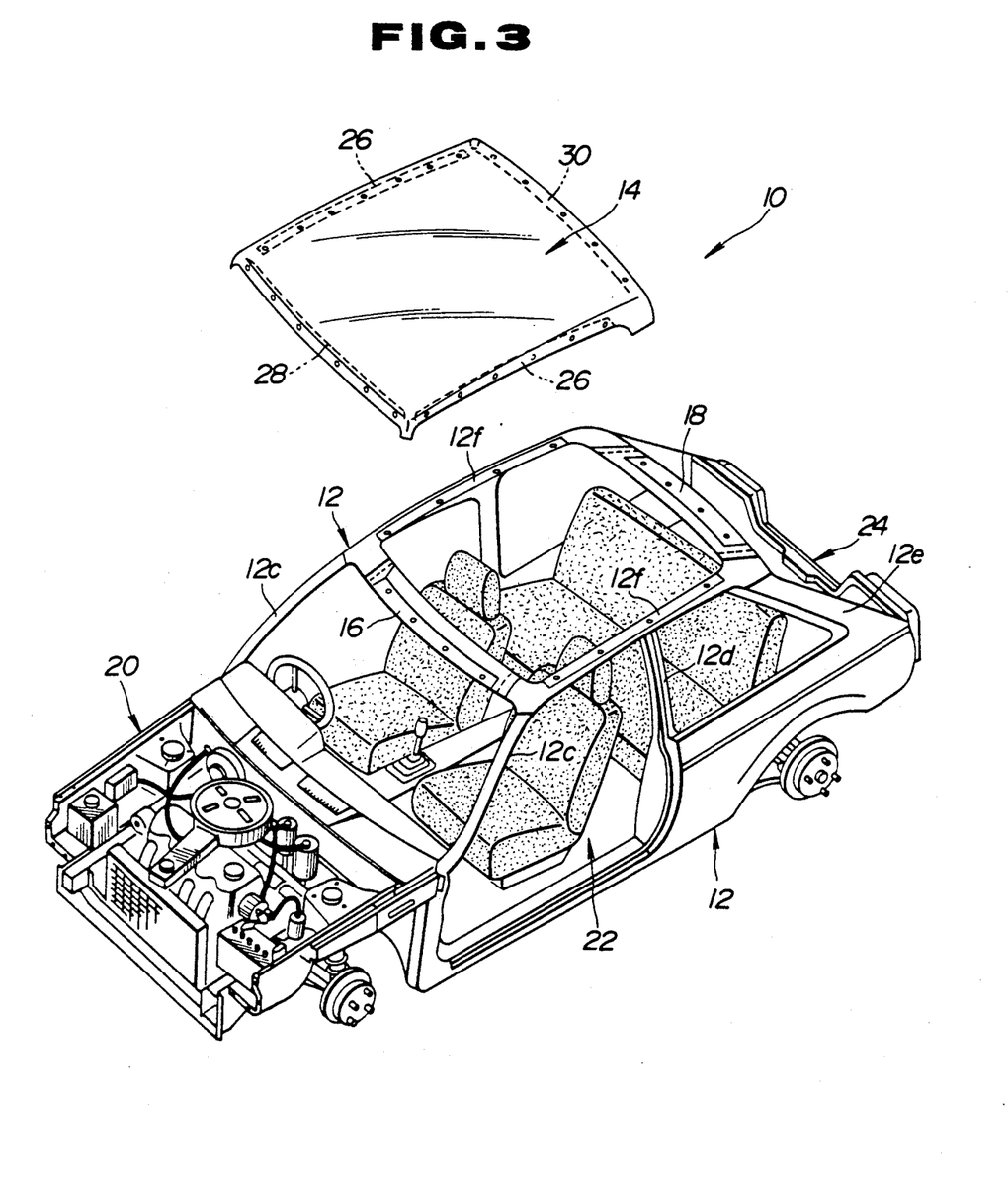
FIG. 3 is a view similar to FIG. 1 but showing the roof structure of this invention in a partly assembled state.

As shown in FIG. 3, the front roof rail 16 is arranged so as to extend between the front ends of the roof side rails 12f and 12f whilst the rear roof rail 18 is arranged so as to extend between the rear ends of the roof side rails 12f and 12f. The front roof rail 16, rear roof rail 18 and the roof side rails 12f and 12f are therefore adapted to constitute a substantially square framework. The front roof rail 16, rear roof rail 18 and each roof side rail 12f have laterally elongated horizontal portions 16c, 18c and an elongated second horizontal bracket portion 12i, respectively. Each of the horizontal portions 16c, 18c and 12a is formed with a plurality of bolt holes 34 which are aligned with the bolts 32 secured to each of the brackets 26, 28 and 30. The inner panels 16a, 18a and 12g of the front roof rail 16, rear roof rail 18 and each roof side rails 12f are formed with access holes 36 which are respectively aligned with the bolt holes 34.

Figure 1:
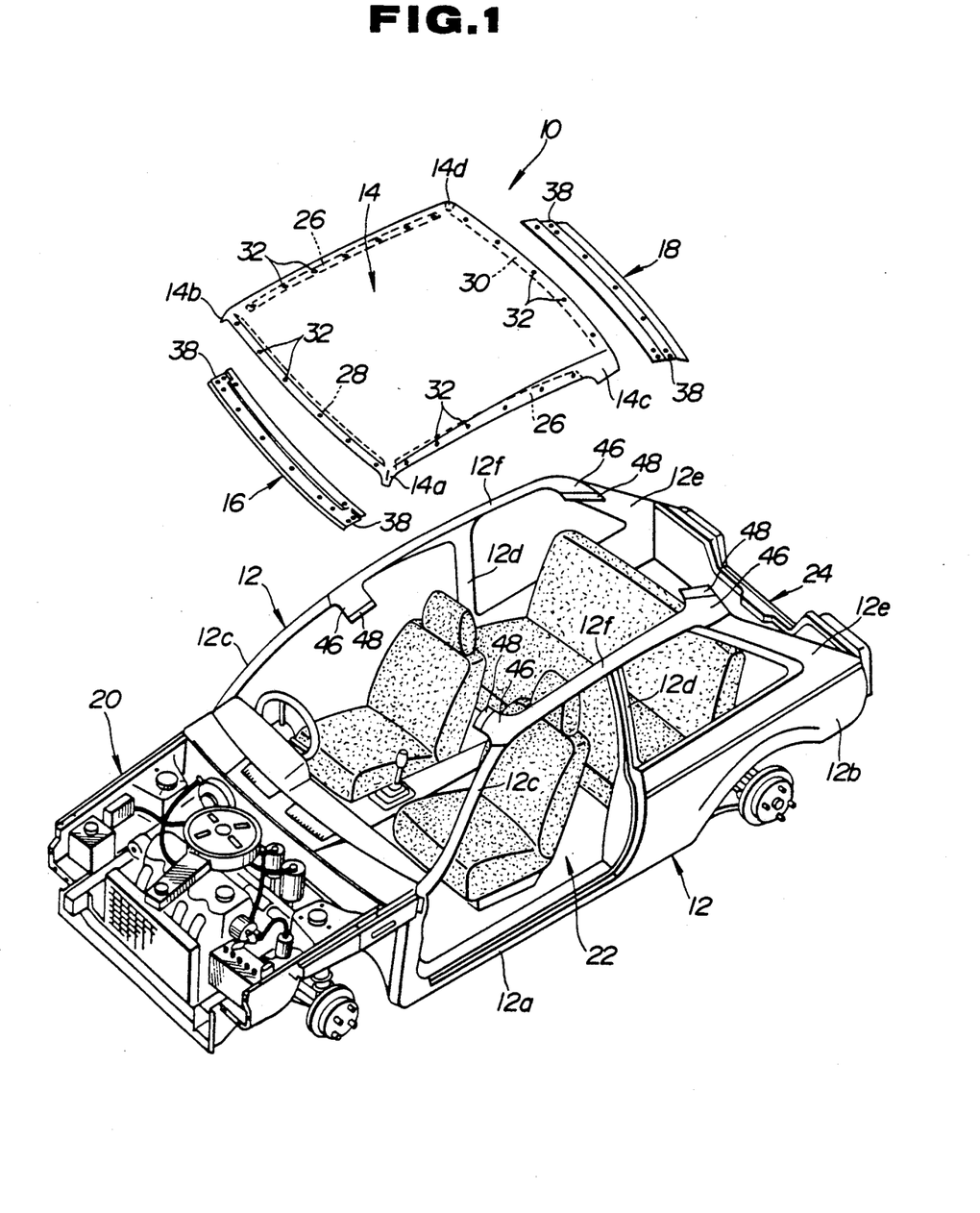
FIG. 1 is a perspective, partly exploded view of a modular vehicle body incorporating a roof structure of the present invention.
Figure 2:
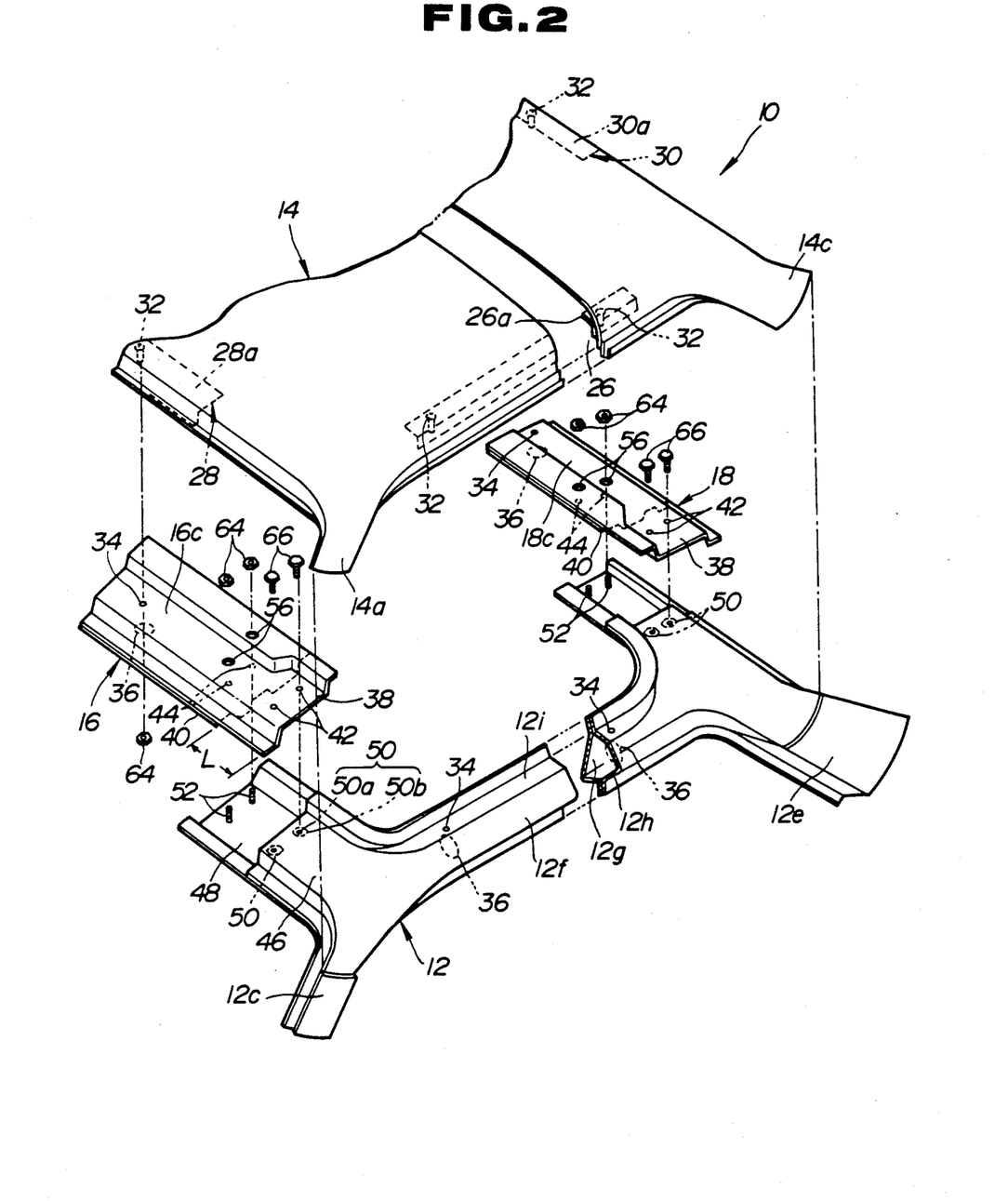
FIG. 2 is an exploded perspective view of a principal portion of a roof structure according to an embodiment of the present invention.
Figure 4:
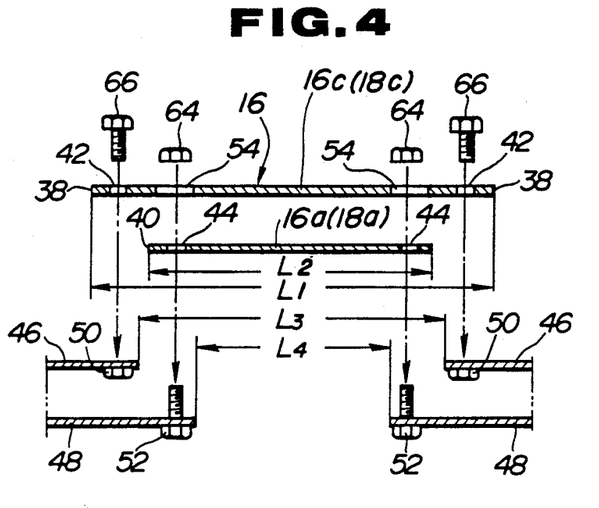
FIG. 4 is a schematic sectional view of a front or rear roof rail and its matched brackets utilized in the roof structure of FIG. 2.
Figure 5:
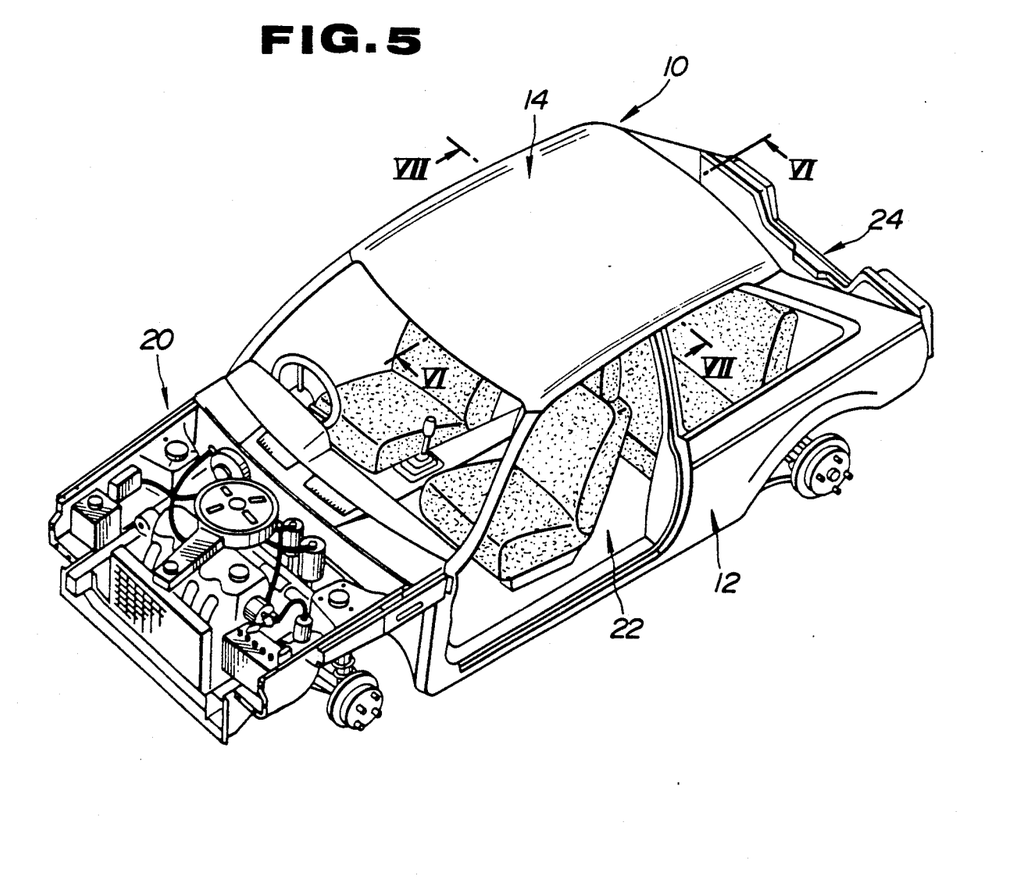
FIG. 5 is a perspective view similar to FIG. 1 but showing the roof structure of this invention in a completely assembled state.

The front roof rail 16 and the rear roof rail 18 each have at the laterally opposed or loingtitudinally opposed ends thereof upper and lower flanges 38 and 40. As shown in FIG. 2, the upper and lower flanges 38 and 40 are different in length with respect to the vehicle width direction so that the upper flange 38 projects laterally outward of the lower flange 40. In this emboidment, the upper flanges 38 are formed integral with the outer panels 16c and 18c of the front roof rail 16 and rear roof rail 18 whilst the lower flanges 40 are formed integral with the inner panels 16a and 18a of the front roof rail 16 and rear roof rail 18. As shown in FIG. 4, the outer panels 16c and 18c are therefore longer than the inner panels 16a and 18a (L1>L2). The upper and lower flanges 38 and 40 are formed with bolt holes 42 and 44, respectively.

The roof side rails 12f and 12f each have at the front and rear ends thereof first lower brackets 48 and first upper brackets 46 extending laterally inwardly of the vehicle body. The upper brackets 46 extend continuously from the joint of the outer panel 12h of the roof side rail 12f and the outer panel (no numeral) of the front pillar 12c and from the joint of the outer panel 12h of the roof side rail 12f and the outer panel (no numeral) of the rear pillar 12e whilst the lower bracket 48 extends continuously from the joint of inner panel 12g of the roof side rail 12f and the inner panel (not shown) of the front pillar 12c and from the joint of the inner panel 12g of the roof side rail 12f and the inner panel (not shown) of the rear pillar 12e. When the body side assemblies 12 and 12 are disposed in place so as to oppose each other laterally with respect to the vehicle body, the distance L3 between the laterally opposed upper brackets 46 and 46 is larger than the distance L4 between the opposed lower brackets 48 and 48 (L3>L4). The aforementioned lengths L1 and L2 and the distance L3 and L4 are so determined as to have such a relationship as L1>L3>L2>L4.

Each upper bracket 46 is formed with threaded holes 50 which are aligned with the bolt holes 42 of the upper bracket 38. The threaded holes 50 consists of holes 50a formed in the upper bracket 46 and nuts 50b welded to the inner surface of the upper bracket 46 in such a way as to be aligned with the holes 50a. Each lower bracket 48 has a bolt 52 aligned with the bolt holes 44 of the corresponding lower flange 40. The bolts 52 are welded or otherwise secured at the head portions to each lower bracket 48. Further, the upper flange 38 is formed with access holes 54 which are aligned with the bolts 52.

Indicated by the reference numeral 56 in FIG. 6 is a back door, by 58 in FIG. 6 is a reinforcement attached to the rear roof rail 18, by 60 in FIG. 7 is a drip channel secured to the roof side rail 12f and by 62 in FIG. 7 is a roof bow secured to the inner surface of the roof 14.

The roof structure described above is built as follows:

The body side assemblies 12 and 12, roof 14, front roof rail 16, rear roof rail 18, engine compartment assembly 20, floor assembly 22 and the rear end assembly 24 are prepared independently, i.e., fabricated and assembled independently. The assemblies and parts are then painted and equipped with devices, components and upholstery independently. Then, the body side assemblies 12 and 12 are fastened with bolts to the floor assembly 22, engine compartment assembly 24 and the rear end assembly 24. The engine compartment assembly 20 and the rear end assembly 24 are fastened with bolts to the front and rear ends of the floor assembly 22, respectively.

The front roof rail 16 is arranged to extend between the front ends of the roof side rails 12f and 12f and fastened with bolts to same. The rear roof rail 18 is arranged to extend between the rear end portions of the roof side rails 12f and 12f and fastened with bolts to the same.

Figure 8:
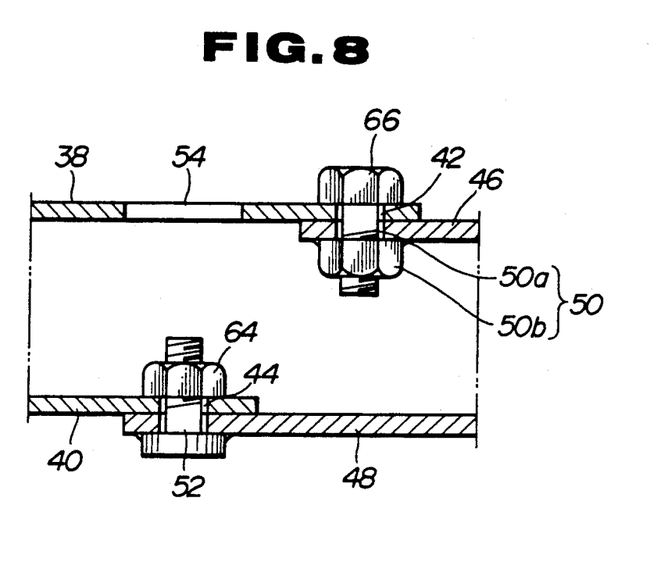
FIG. 8 is a sectional view of a front or rear roof rail and its matched bracket in an assembled state.

More specifically, as shown in FIGS. 2, 4 and 8, the front roof rail 16 and the rear roof rail 18 are first held above the roof side rails 12f and 12f and then lowered to allow the upper and lower flanges 38 and 40 to be respectively placed on the upper and lower brackets 46 and 48 while allowing the bolts 52 of the lower brackets 48 to be inserted into the bolt holes 44 of the lower flanges 40. Thereafter, nuts 64 are screwed on the bolts 52 projecting upwardly from the bolt holes 44 by access thereto through the access holes 54 whilst bolts 66 are secrewed through the bolt holes 44 into the threaded holes 50. Then, the roof 14 held above the front side rail 16, rear side rail 18 and the roof side rails 12f and 12f as shown in FIG. 3 is lowered to be placed on same and fastened with bolts thereto by way of the brackets 26, 28 and 30. In this connection, as shown in FIGS. 2, 6, 7 and 9, the horizontal portions 26a, 28a and 30a of the brackets 26, 28 and 30 are placed on the horizontal portions 16c, 18c and 12i of the front roof rail 16, rear roof rail 18 and each roof side rail 12f, allowing the bolts 32 depending from the brackets 26, 28 and 30 to be inserted into the bolt holes 34 formed in the horizontal portions 16c, 18c and 12i of the front roof rail 16, rear roof rail 18 and each roof side rail 12f whilst allowing the extensions 14a–14c of the roof 14 to be placed on the joint of the roof side rail 12f and the front pillar 12c and on the joint of the roof side rail 12f and the rear pillar 12e. Thereafter, nuts 64 are screwed onto the bolts 32 projecting downwardly from the bolt holes 34 by access thereto through the access holes 36.

From the foregoing, it will be understood that the roof structure of this invention is easy to build or assemble since the front roof rail and rear roof rail are utilized to interconnect the front and rear ends of the roof side rails so as to constitute a rigid square framework and the roof is adapted to be fastened to the roof rails by way of the brackets. Due to the brackets, the roof can be easily located in position on the roof rails.

It will be further understood that the roof structure of this invention can provide an improved appearance since the roof is adapted to be bolted through the brackets to the roof rails in such a way that the bolts are not exposed to viewers.

It will be further understood that various versions of roof assemblies can be prepared based on various vehicle underbodies to attain various kinds of vehicles with ease and efficiency.

While the front roof rail 16, rear roof rail 18, roof side rails 12f and the roof 14 have been described and shown as being fastened to each other with bolts, this is not limitative but they can otherwise be joined together by bonding.

What is claimed is:

1. A roof structure for a modular vehicle body comprising:

a pair or roof side rails, each constituting part of one of two body side assemblies, respectively, and each of said rails having first bracket means at a front end and a rear end thereof and second bracket means between said front and rear ends thereof;

a roof having on the inner side thereof roof bracket means which extend inwardly from an outer periphery of said roof in such a way as to constitute a dual-wall structure together with said roof and rear bracket means extending outwardly from said periphery;

said second bracket means of said roof side rails being matched with said roof bracket means of said roof;

a front roof rail having at the laterally opposed ends thereof flange means matched with said first bracket means at the front ends of said roof side rails, said front roof rail having bracket means between said flange means thereof matched with said roof bracket means of said roof;

a rear roof rail having at the laterally opposite ends thereof flange means matched with said first bracket means at the rear ends of said roof side rails, said rear roof rail having bracket means between said flange means thereof matched with said rear bracket means of said roof;

a plurality of mechanical fasteners independent from said roof side rails, said roof and said front and rear roof rails for mechanically fastening said flange means of said front roof rail and said rear roof rail to said first bracket means of said roof side rails and for fastening said roof bracket means of said roof to said bracket means of said front roof rail and said second bracket means of said roof side rails and said rear bracket means to said bracket means of said rear roof rail;

wherein said roof bracket means comprises a front end bracket and a pair of lateral end brackets each having horizontal portions, said rear bracket means comprises a rear end bracket having a horizontal portion, and said bracket means of said front and rear roof rails and said second bracket means of said roof side rails having horizontal portions on which said horizontal portions of said front end bracket, said rear end bracket and said lateral end brackets are placed;

wherein each of said roof side rails has inner and outer panels, said first bracket means of said roof side rails comprising an outer bracket extending continuously from said outer panel of said roof side rail and an inner bracket extending continuously from said inner panel of said roof side rail, each of said front and rear roof rails having inner and outer panels, each of said flange means of said front roof rail and said rear roof rail having an outer flange and an inner flange integral with said outer and inner panels respectively of said front roof and rear roof panels and joined with said outer bracket and said inner bracket of each of said first bracket means of said roof side rails; and wherein said outer and inner flanges of said front and rear roof rails and said outer and inner brackets of said roof side rails are designed so as to satisfy the relation of L1 and greater than L3 greater than L2 greater than L4 where L1 is the length of said outer panel of each of said front and rear rails, L2 is the length of said inner panel of each of said front and rear roof rails, L3 is the distance between said outer brackets at each of the front ends and the rear ends of said roof side rails, and L4 is the distance between said inner brackets at each of the front ends and the rear ends of said roof side rails.

2. A roof structure as set forth in claim 1 wherein said body side assemblies include front pillars and rear pillars, said roof having four corners and extensions at said four corners, said extension having outer surfaces extending continuously from outer surfaces of said front pillars and said rear pillars.

* * * * *